United States Patent
Liu et al.

(10) Patent No.: US 8,645,321 B1
(45) Date of Patent: Feb. 4, 2014

(54) ASYNCHRONOUS DATA INTEGRITY FOR ENTERPRISE COMPUTING

(75) Inventors: Tse-hsin Jason Liu, Wellesley, MA (US); Yunyan Wang, Framingham, MA (US); Wei Miao, Cambridge, MA (US); Fang Xie, Burlington, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 1393 days.

(21) Appl. No.: 11/443,364

(22) Filed: May 31, 2006

(51) Int. Cl.
*G06F 7/00* (2006.01)

(52) U.S. Cl.
USPC .......................................... 707/613; 709/248

(58) Field of Classification Search
USPC ................... 707/102, 201, 613; 709/224, 248
See application file for complete search history.

(56) References Cited

U.S. PATENT DOCUMENTS

| | | | | |
|---|---|---|---|---|
| 5,446,885 A * | 8/1995 | Moore et al. | ............... | 707/103 R |
| 5,802,514 A | 9/1998 | Huber | | |
| 5,974,407 A | 10/1999 | Sacks | | |
| 5,987,506 A | 11/1999 | Carter et al. | | |
| 6,192,131 B1 * | 2/2001 | Geer et al. | ................... | 380/283 |
| 6,243,703 B1 | 6/2001 | Couch et al. | | |
| 6,298,342 B1 | 10/2001 | Graefe et al. | | |
| 6,407,761 B1 | 6/2002 | Ching et al. | | |
| 6,411,313 B1 | 6/2002 | Conlon et al. | | |
| 6,557,008 B1 * | 4/2003 | Temple et al. | ............. | 707/104.1 |
| 6,678,882 B1 * | 1/2004 | Hurley et al. | ................. | 717/121 |
| 6,684,383 B1 | 1/2004 | Natori et al. | | |
| 6,732,122 B2 * | 5/2004 | Zoltan | ........................... | 707/201 |
| 6,868,441 B2 * | 3/2005 | Greene et al. | ................ | 709/220 |
| 6,947,946 B2 | 9/2005 | Nishikawa | | |
| 7,251,653 B2 | 7/2007 | Huang et al. | | |
| 7,363,264 B1 | 4/2008 | Doughty et al. | | |
| 2001/0048728 A1 * | 12/2001 | Peng | ............................. | 375/354 |
| 2002/0019887 A1 | 2/2002 | Moore | | |
| 2002/0165745 A1 * | 11/2002 | Greene et al. | ..................... | 705/7 |
| 2002/0169650 A1 | 11/2002 | Dougherty et al. | | |
| 2002/0178026 A1 * | 11/2002 | Robertson et al. | ................ | 705/1 |
| 2003/0091963 A1 | 5/2003 | Fukushima | | |
| 2004/0010571 A1 | 1/2004 | Hutchinson et al. | | |
| 2004/0143464 A1 | 7/2004 | Houle et al. | | |
| 2004/0177339 A1 | 9/2004 | Plaisted et al. | | |
| 2005/0050069 A1 | 3/2005 | Vaschillo et al. | | |
| 2005/0060245 A1 | 3/2005 | Hoffman et al. | | |
| 2005/0240572 A1 | 10/2005 | Sung et al. | | |
| 2006/0026176 A1 * | 2/2006 | Dettinger et al. | ............. | 707/100 |
| 2006/0184568 A1 | 8/2006 | Barcia | | |
| 2007/0074130 A1 | 3/2007 | Folting et al. | | |

OTHER PUBLICATIONS

Taveter et al., Agent-Oriented Enterprise Modeling Based on Business Rules, 2001, pp. 527-540.*
Article from Think Customer Data entitled "Customer Data Hubbing": Not Without Challenges (45 pages).
Database Systems Concepts (Chapters 1-25).
Database Management Systems—Instructor: Raghu Ramakrishnan (366 pages).
Article and PowerPoint slides entitled "Semantic Integration Research in the Database Community: A Brief Survey" by AnHai Doan and Alon Y. Harvey (35 total pages).

* cited by examiner

*Primary Examiner* — James Trujillo
*Assistant Examiner* — Dawaune Conyers (57) ABSTRACT

A first database comprises a data entity and a first data model that models the data entity. An agent comprises a data rule concerning the data entity. A plurality of second databases comprises the data entity. A messaging module comprises the agent and is configured to send a message to at least one of the second databases according to the data rule and the general data model.

22 Claims, 3 Drawing Sheets

ASYNCHRONOUS DATA INTEGRITY FOR ENTERPRISE COMPUTING

BACKGROUND INFORMATION

A typical enterprise computing environment includes multiple heterogeneous and distributed databases supporting a variety of different systems. For example, many enterprises such as businesses and the like have different systems to support customer billing, sales, accounting, inventory, ordering, procurement, etc. Further, many enterprises are the result of a merger of two or more predecessors, each with their own set of heterogeneous, and distributed databases. Notwithstanding the diversity of an enterprise's databases, there are typically many data common to some or all of these databases. However, the same data in different databases is often stored in different formats, e.g., having different databases, stored according to different technologies, organized according to different data models, used for different business purposes and according to different business rules, etc.

To take just one example of data that may be common to many organizations across an enterprise, many enterprises, e.g., companies, assign a unique identifier to each of the company's customers. Further, many companies assign a unique identifier to each customer account. Generally, the relationship of customer to accounts is a one-to-many relationship. Very few, if any, enterprises assign standard customer identifiers and account identifiers that are used in all systems across the enterprise, particularly when an enterprise results from the merger or combination of other organizations. Moreover, in the many enterprises that do not assign standard customer and account identifiers, it is difficult, and often impossible, in present enterprise environments, to ensure that data representing the same customers and accounts is created, maintained, and updated consistently across all systems within the enterprise. Further, even enterprises that do maintain standard customer and account identifiers across all enterprise systems face difficulties when, as is common in today's business world, such enterprises are acquired by or merged with other enterprises having their own different systems and methods for maintaining customer and account information.

Attempts have been made to reconcile the different versions of the same data in the diverse systems within an enterprise. For example, there is a field of research dedicated to what is known as "schema integration." In an approach generally known as creating a "Mediated Schema", a special database, or table within a database, may include associations between customer identifiers maintained in different systems within an enterprise. However, even where links between like data in diverse systems are maintained, it is generally difficult for different systems within an enterprise to enforce data integrity across all, or even some, of the different systems in the enterprise. For example, schema mapping by itself will not prevent a loss of data integrity when a billing system updates data associated with a customer identifier, but this update is not propagated to a sales and marketing system. Similarly, if data is incorrectly translated from one system to another, data integrity will be lost.

Despite the foregoing difficulties in reconciling and maintaining data in diverse systems, there are many reasons why multiple heterogeneous and independent data systems may exist within an enterprise. Where systems were created using different technologies or different data models, there may be considerable disruption to the enterprise, not to mention considerable time and expense, in migrating the multiple systems to the same technology platform. Accordingly, in many cases it is simply impossible, or at least impractical, for an enterprise to integrate its multiple heterogeneous and independent data systems. Further, the risk of committing the entire enterprise to a single technology platform is unacceptable to many enterprises, given the possibilities that, for a given technology platform, software vendors may go out of business, properly experienced staff may be unavailable, the technology may not prove to be robust or adequate to the needs of the enterprise, etc. Moreover, from the standpoint of resisting and recovering from disasters, it is advantageous for an enterprise to have multiple systems that are widely dispersed geographically and in terms of technology platforms, business units, etc.

Accordingly, there is a need for systems and methods that not only map data across diverse systems, but that also enforce and maintain the integrity of data across multiple heterogeneous and independent data systems.

DETAILED DESCRIPTION OF THE PREFERRED EMBODIMENTS

I. Introduction

A general data model may be established that is common to various systems within an enterprise, that is, that includes data entities and their relationships for not just one but for some or all of the various systems within an enterprise. For example, a "customer" element common to various systems within the enterprise may be defined in a general data model and mapped to data models local to each of the various systems in an enterprise, thereby allowing such various systems to communicate with one another concerning the customer data element. Because it can be expensive, difficult, and time-consuming to revise existing data models that are local to various systems in an enterprise, a data operation application layer, i.e., an agent application programmed according to certain business rules, is used to translate between local data models, and between a local data model and a general data model, according to mappings included in the general data model.

Advantageously, the business rules according to which the agent is programmed may be tailored to accommodate the various relationships between various systems within an enterprise. For example, between a first and a second database, it may be desirable that any changes in either database be reflected in the other. For example, it may be desirable to allow a customer ordering system to update a billing system, and vice versa. However, as between a first database and a third database, it may be desirable that changes in the first database are reflected in the third database, but not vice-versa.

For example, it may be desirable to allow a customer ordering system to update a marketing system, but not to allow the marketing system to update the billing system. Further, it may be desirable that changes to some data entities or some tables in a fourth database are reflected in a first database, whereas changes to some other data entities or some other tables in the fourth database are not reflected in the first database. For example, it may be desirable to allow a marketing database to update a customer's address in a billing system, but not to allow the marketing database to update any billing information in the billing system. As should be apparent, the agent may be flexibly programmed to accommodate different sets of business rules.

With a general data model that is common to diverse systems defined, a set of rules for data synchronization, i.e., a data synchronization protocol, is defined among such diverse systems. Such a protocol provides a common format for messages concerning data entities defined by a general data model, and allows various systems to be consistently instructed to operate on data entities defined by the general data model. For example, assume that a particular data element has been added to a first database and a business rule specifies that the data element should accordingly be added to a second database. In such a case, a mapping in a general database may be used to translate the data element from a format used in the first database to a format used in the second database. Further, a message formatted according to a data synchronization protocol may be used to instruct the second database to add the data element.

Data synchronization may be performed asynchronously, that is, data may be added to, modified in, or deleted from, various systems at different times according to business rules varyingly applicable to the various systems. Various systems may be arranged hierarchically, so that changes in lower level systems are communicated upward to parent systems. Once such changes reach the top level in the hierarchy they may be communicated to other lower level systems as dictated by business rules programmed into agents.

Accordingly, data integrity monitoring and enforcement may be advantageously performed for a plurality of systems at a top level in a hierarchy of systems. Business rules may be defined to monitor data operations, such as adding, deleting, and modifying data in various systems. When problems are encountered in maintaining data integrity, an agent at the top level in a hierarchy of systems may send a message to each system in a set of systems to revise, update, delete, or add certain data.

Further, the history of data transactions within an enterprise may be stored in a database or the like both to provide an audit trail in the event that data integrity issues arise, and to provide a record that can be used for disaster recovery.

II. Information Management System Overview

Figure 1:
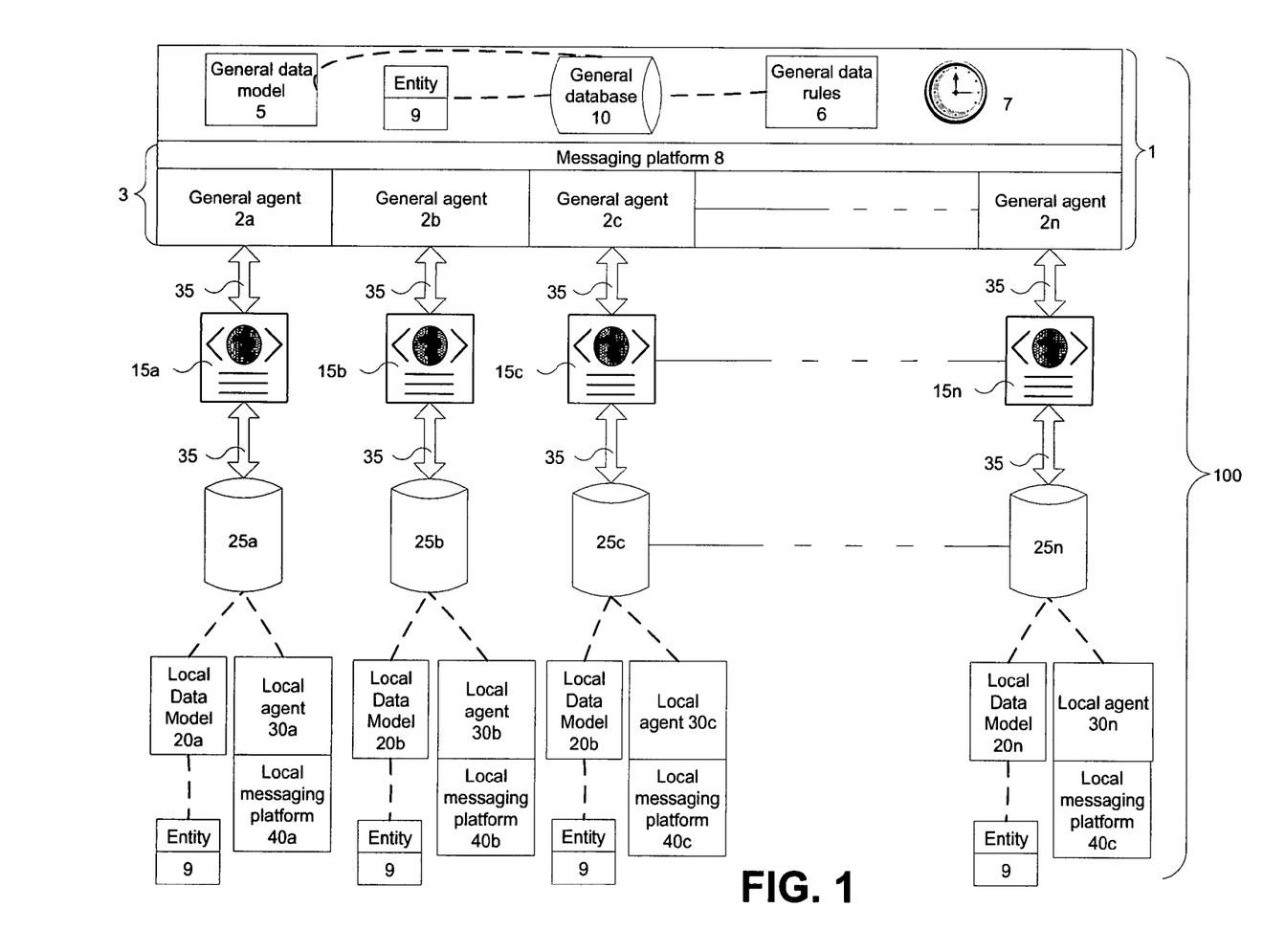
FIG. 1 illustrates an information management system, according to an embodiment.

FIG. 1 illustrates an information management system 100, including a general information manager (GIM) 1, according to an embodiment. GIM 1 includes a plurality of agent applications 2. GIM 1 further includes general data model 5 and general data rules 6, which, in addition to data entities 9, may be stored in general database 10. GIM 1 generally further includes scheduler 7, which is a software application such as is well known which may be used to invoke other software applications at predetermined times. Further, GIM 1 includes messaging platform 8 that provides for communication between diverse computer applications and systems, such as, in one embodiment, WebSphere MQ, sold by International Business Machines Corporation of Armonk, N.Y. Together, general agent applications 2 and general messaging platform 8 are comprised within messaging module 3 within GIM 1 that can generate, send and receive messages 15 to and from local databases 25.

General data model 5 is a data model such as an entity relationship model or the like that contains global definitions and relationships for data entities 9 within an enterprise. General data model 5 is advantageous because it provides a common definition of data entities 9 used within an enterprise that may be used according to local data models 20 in local databases 25. Accordingly, general data model 5 preferably includes mappings for translating data entities 9 from general data model 5 to local data models 20.

Various local data models 20 include data entities 9 that are modeled in general data model 5, although such entities 9 may be, and generally are, modeled differently in local data models 20. Further, a local data model 20 generally includes a subset of the data entities 9 included in general data model 5. Accordingly, a local data model 20 may be mapped to general data model 5, and local data model 20 will generally include a portion of the mapping included in general database 10 for the data entities mapped in general database 10 that are included in local database 25.

Messages 15 use a data synchronization protocol 35 that can be understood by all local databases 25. Data synchronization protocol 35 is defined in one embodiment using extensible markup language (XML). Messages 15 include instructions for adding, deleting, and/or modifying data in general database 10 and local databases 25. Messages 15 are sent to and from local databases 25 through local messaging platform 40, such as, in one embodiment, WebSphere MQ, sold by International Business Machines Corporation of Armonk, N.Y.

GIM 1, and databases 5 and 25, may include one or more computing devices configured to communicate through a network, such as a local area network (LAN), wide area network (WAN), the Internet, or other network for exchanging digital information, as is well known. Computing devices may include any one of a number of computing devices, including, without limitation, a computer workstation, a desktop, notebook, laptop, or handheld computer, or some other computing device as is generally known, such as a Java-enabled cellular telephone or similar device. Computing devices such as the foregoing may employ any of a number of computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Further, GIM 1, databases 5 and 25, and local agents 30 may each include instructions executable by one or more computing devices such as those listed above. Such instructions may be compiled or interpreted from computer programs created using a variety of programming languages and/or technologies, including, without limitation, and either alone or in combination, Java™, C, C++, Visual Basic, Java Script, Perl, etc. For example, in one embodiment agent application 2 included within GIM 1 includes Enterprise Java Beans (EJBs), as does agent 40, and also databases 5 and 25 may include stored procedures written in the PL/SQL language provided by Oracle Corporation of Redwood Shores, Calif. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases 10 and 25 each generally comprise a relational database management system (RDBMS), as is well known. An RDBMS generally employs the well known Structured Query Language (SQL) in addition to a language for creating, storing, editing, and executing stored procedures, such as the PL/SQL language mentioned above. However, it is to be understood that databases 10 and 25 may be some other kind of database such as a hierarchical database, a set of files, an application database in a proprietary format, etc. Each database 10 and 25 generally includes a computing device employing a computer operating system such as one of those mentioned above, and are accessed via a network in any one or more of a variety of manners, as is well known. Embodiments are possible in which at least some of databases 10 and 25 are both included in one RDBMS or are located within a single computing device.

III. Databases

As mentioned above, general database 10 includes general data model 5 and general data rules 6. Further, portions of general data model 5 relevant to a local database 25 are stored in the local database 25 for use by local agents 30 as described below.

A. General Data Model

General data model 5 is generally a relational data model that includes data entities 9 common to local databases 25. Data entities 9 may include any data entities represented in data models 5 and 20 within an enterprise. A data entity 9 generally includes a plurality of attributes that describe various aspects of the entity 9.

An example used herein is a "customer" data entity 9 such as will be modeled within many business enterprises. Attributes of a "customer" entity 9 may include a customer name, a customer street address, a customer city and state, a customer telephone number, a customer age, etc. However, it is to be understood that the "customer" data entity 9 example is intended to be illustrative and is not at all limiting. Indeed, those skilled in the art will recognize that an infinitude of data entities 9 is possible. To take just a few examples purely for the purpose of further illustration, entities 9 that could be included in data models 5 and 20 include parts, products, inventory, equipment, plants, buildings, store locations, customer accounts, customer categories, prospective customers, geographic locations, periods of time, distances, services, data consumption, raw materials consumption, expenses, revenues, profits, etc.

One challenge in consistently maintaining local databases 25 arises because not all attributes for a data entity 9 are necessarily represented in all local data models 20, although general data model 5 generally includes all attributes for a data entity 9. Further, different local data models 20 may represent attributes for the same data entity 9 in different ways, requiring mapping and translation for local databases 25 to be consistently maintained through GIM 1.

For example, two or more local databases 25 may include a customer data entity 9 including attributes representing customer names, customer addresses, etc. However, such attributes may be represented differently in local data models 20. For example, a first local data model 20 may represent a customer identifier as a combination of a customer's name and telephone number, while a second local data model 20 may represent a customer identifier as a customer's social security number. Consequently, general data model 5 maps the modeling of data entities 9, e.g., customer data entity 9, between local data models 20.

In general, data entities 9, and their relation to other data entities 9, are included in general data model 5, along with a mapping of the representations of data entities 9 in various local data models 20. As is known, data entities 9 in a relational model are organized into columns, or fields, in one or more tables. Data entities 9 inserted in tables arranged according to a relational model are associated with rows, or records, that are uniquely identified according to a primary key for the table to which the row or record belongs. Foreign keys in table records allow for the association of data entities 9 in the table with data entities 9 in other tables. Accordingly, data model 5 generally specifies primary keys for tables as well as foreign key relationships. Data model 5 generally further specifies the data type and length for various data entities 9, e.g., a "customer name" field may be specified to be a twenty character string.

Examples of local databases 25 include, without limitation, databases associated with billing systems, accounting systems, customer provisioning systems, inventory systems, manufacturing systems, contact management systems, sales management systems, etc. Local systems including local databases 25 may be purchased from vendors, or may be developed internally and may be proprietary to an enterprise. Different local systems often employ, and thus different local databases 25 within an enterprise often include, the same data entities 9. For example a billing system and a customer provisioning system may each include a "customer" data entity 9, and generally will include data relating to the same customers. However, a data model 20a for a billing system may represent a customer data entity 9 differently that the modeling of the same entity 9 in a data model 20b for a customer provisioning system. For example, a billing system may identify a customer according to the customer's telephone number, while a customer provisioning system may identify a customer by a combination of the customer's name and address.

B. Data Mapping Rules

General data rules 6 meet a variety of needs, and may be implemented in a variety of ways. Needs met by data rules 6 include mapping data entities 9 in local data models 20 to general data model 5. Data rules 6 also provide rules for prioritizing messages 15, and business rules specifying when and how databases 10 and 25 may be updated. Certain data rules 6 may be, and generally are, implemented as program code, e.g., in agent application 2, although generally some data rules 6, e.g., data rules 6 for mapping general data model 5 to local data models 20, are stored in general database 10. Such mappings as carried out in one embodiment are explained in more detail in co-pending application Ser. No. 11/443,363, entitled "SYSTEMS AND METHODS FOR MANAGING INTEGRATED AND CUSTOMIZABLE DATA," filed the same day as the present application and fully incorporated herein by reference in its entirety. Common scenarios in which such synchronization and mapping is necessary include adding data concerning an entity 9 to a local database 25, thereby warranting the data to be added to other local databases 25, updating data concerning a data entity 9, e.g., a customer, in a first local database 25 thereby requiring updates to other local databases 25, deleting data concerning an entity in a local database 25, thereby requiring data to be deleted form other local databases 25, etc.

To address the unfortunately common situation in which data entities 9 are modeled differently in various data models 20 it is necessary for general database 10 to provide a map showing how an entity 9 in general data model 5 is modeled in various local data models 20. Accordingly, data rules 6 may provide for mapping data entities 9 included in general data model 5 to corresponding data entities 9 in local database 25. For example, data model 5 may include a "customer identifier" data element serving as a primary key for a "customer" entity 9. Local database 25 may correspondingly include a "customer" entity 9 having as a primary key a field named "cust_id." Further, "cust_id" may be limited to eight numeric characters in local database 25. Accordingly, a data rule 6 is required in this example to specify that data inserted in a "cust_id" field in local database 25 be constrained to eight numeric characters. Another data rule may specify that data to be inserted in a "telephone number" field in local database 25 be converted if necessary from a numeric format to an alphanumeric format.

Mapping data rules 6 are relatively straightforward in instances where an entity 9, e.g., a "customer," is associated with a common identifier, i.e., primary key, in different local data models 20, and further is associated with columns or fields having like data types and sizes in various local data models 20. Where data entities 9 are modeled identically or substantially identically in different data models 20, mapping rules 6 can be implemented as a simple "schema mapping." That is, mapping data rules 6 need simply provide the correspondences between names of various field associated with the entity in respective local data models 20.

Unfortunately, this relatively straightforward case is not the usual scenario. More often, an entity 9 in one local database 25 will be modeled differently in a local data model 20 for a second local database 25. Table 1 provides an illustration of how a "customer" entity 9 could be modeled differently in different local data models 20 and general data model 5.

TABLE 1

| Model | Primary Key | Name | Postal Code | Phone No. |
|---|---|---|---|---|
| 20a | Cust_id (int) | Cust_name (char(20)) | Zip (char(5)) | P_no (varchar(10)) |
| 20b | Subscr (char(10)) | Cname (varchar(25)) | Z3d (int) | Phone (int(10)) |
| 20c | CID (int) | Cust (varchar(30)) | Mail3d (int(10)) | Tele_id (int(10)) |
| 5 | CID (int) | Cust (varchar(30)) | Mail3d (int(10)) | Tele_id (int(10)) |

In the example provided in Table 1, general data model 5 models the "customer" entity identically to local data model 20c, although it should be understood that embodiments are possible and likely in which general data model 5 models entities different from any of local databases 20. Further, embodiments are possible in which data entities are not stored in general database 10 corresponding to data entities 9 stored in local databases 25, although often it is desirable to maintain in database 10 data mirroring data in local databases 25 as a "master," or reference, set of data.

As should be apparent, complex data rules 6 are necessary to allow for mapping and synchronization between data entities 9 stored in local databases 25 according to respective local data models 20. For example, even more complex data rules 6 than are suggested by Table 1 may be necessary where data entity 9 has different attributes in different local data models 20. Co-pending application "SYSTEMS AND METHODS FOR MANAGING INTEGRATED AND CUSTOMIZABLE DATA," Ser. No. 11/443,363, mentioned above, discusses such situations in more detail.

IV. Agents

Business logic data rules 6 according to an embodiment are implemented as program code in agents 2 and 30, although embodiments are possible in which business logic data rules 6 are implemented elsewhere. For example, business logic data rules could be implemented as stored procedures in databases 10 and 25.

A. General Agents

General agents 2 according to an embodiment are implemented in program code written in the JAVA™ programming language. This embodiment includes general agents 2a, 2b, 2c, . . . , 2n, each general agent 2 corresponding to a local database 25a, 25b, 25c, . . . , 25n. In conjunction with messaging platform 8, general agents 2 are comprised in messaging module 3 and send and receive messages 15 to and from local databases 25. Further each general agent 2 may in fact be two separate computer programs, one for receiving messages 15 from a particular local database 25, and one for sending messages to a particular local database 25. Accordingly, agents 2 generally send messages to and/or receive messages from a corresponding agent 30 included in local database 25.

As mentioned above, business logic data rules 6 may be implemented in general agents 2. In fact, one reason for creating distinct general agents 2 for each different local database 25 is to separate business logic data rules for different local databases 25. Further, various local databases 25 may require different instructions for different RDBMS platforms, providing another reason why it is convenient and efficient to modularize general agents 5.

Data rules 6 in general agents 2 generally address the conditions under which modifications may be made to local database 25. Examples of business logic data rules 6 are rules limiting which local databases 25 can effect a change for a particular data entity 9. For example, a marketing database 25 may not be allowed to modify data relating to a customer data entity 9 in an order system database 25, whereas a billing system database 25 may always have permission to do so.

B. Local Agents

Local agents 30a, 30b, 30c, . . . , 30n are included in local databases 25a, 25b, 25c, . . . , 25n, e.g., as stored procedures, or exists as separate computer programs that are stored on and run on the same computer as, or an associated computer to, local databases 25a, 25b, 25c, . . . , 25n. Local agents 30a, 30b, 30c, . . . , 30n generally send messages to and/or receive messages from a corresponding general agent 2a, 2b, 2c, ..., 2n. Each local agent 30 may in fact be two separate computer programs, one for receiving messages 15 from GIM 1, and one for sending messages to GIM 1.

IV. Messages

A. Data Synchronization Protocol

In one embodiment data synchronization protocol 35 is implemented using messages 15 conforming to a predetermined extensible markup language (XML) document type definition (DTD) or schema. In an embodiment, different types of messages 15 may include record level messages 15 and record set level messages 15. Messages 15 may also include error messages 15 corresponding respectively to record level messages 15 and record set level messages 15. Further, data synchronization protocol 35 may be implemented in a plurality of versions, each version customized for messages 15 to and from a particular local database 25.

1. Record Level Messages

Record level messages 15 include instructions to add, delete, or modify one or more individual records in one or more tables in a local database 25. Table 1 below provides an exemplary record level message 15 according to an embodiment. The message 15 shown in Table 1 instructs local database 25 to add a row, i.e., record.

TABLE 2

```
<?XML VERSION="1.0"?>
<!DOCTYPE ROOT SYSTEM "dtds/CUSTOMER.dtd">
<ROOT>
<ACTION>I</ACTION>
<TRANSACTION_ID>G00001</TRANSACTION_ID>
<TABLE>CUSTOMER</TABLE>
<ROWSET>
   <ROW>
      <CUSTOMER_OID>106380</CUSTOMER_OID>
      <CUSTOMER_NAME>ABCXYZ, INC.</CUSTOMER_NAME>
      <CUSTOMER_TYPE>1</CUSTOMER_TYPE>
      <STATUS>A</STATUS>
      <CREATED4ATE>201-7-21 10-42-9 </CREATED4ATE>
      <TIER>3</TIER>
      <USER_ID>0</USER_ID>
      <TIMESTAMP>202-6-21 10-42-9</TIMESTAMP>
      <LOB>E</LOB>
      <CODE_TYPE>T</CODE_TYPE>
      <CODE_NAME>PK036466</CODE_NAME>
      <CONTRACT_TYPE>M</CONTRACT_TYPE>
   </ROW>
</ROWSET>
</ROOT>
```

In Table 3, the "action" tag is used to specify an action to be taken with respect to the records identified in a message 15. In this example, the action to be taken is specified as "I," indicating that a record is to be added, i.e., inserted, to the table in local database 25 specified by the "table" tag. Table 2 shows a message 15 adding one record to a "customer" table in database 25, but the message 15 could specify the insertion of multiple records, i.e., Table 2 shows one set of "row" tags, but a message 15 could easily include multiple sets of "row" tags. The tags nested in the set of "row" tags in Table 2 specify columns or records in the "customer" table in database 25. The data marked by these tags is data that is included in the new record in Table 2.

Record level error messages 15 may be used simply for audit and reporting purposes, or may be used in some cases, depending on the error reported, to correct the reported error. Table 3 shows an exemplary record level error message 15.

TABLE 3

```
<?XML VERSION= "1.0"?>
<!DOCTYPE ROOT SYSTEM "dtds/errors.dtd">
<ROOT>
   <ACTION>I</ACTION>
   <TABLE>CUSTOMER</TABLE>
   <ERROR_TYPE>DUPLICATE</ERROR_TYPE>
   <PRIMARY_KEY>106380</PRIMARY_KEY>
</ROOT>
```

2. Record Set Level Messages

Record set level messages 15 include messages 15 to add, delete, or modify sets of records. One difference between record level messages 15 and record set level messages 15 is that record set level messages 15 generally include one or more commands formatted according to a query language such as Structured Query Language (SQL) to be executed by local database 25. Using such commands it is possible to perform operations on a set of records at one time. For example, Table 4 shows an exemplary message 15 instructing local database 25 to update a "customerccount" table.

TABLE 4

```
<?XML VERSION="1.0"?>
<!DOCTYPE ROOT SYSTEM "dtds/sql.dtd">
<ROOT>
   <TRANSACTION_ID>/G00001</TRANSACTION_ID>
   <SQL>UPDATE CUSTOMERCOUNT SET CUSTOMER_OID =
   106380, USER_ID = -200, TIMESTAMP = SYSDATE WHERE
   ACCOUNT_OID IN (1, 2, 3, 4, 5, 6, 7, 8, 9,
   10)</SQL>
</ROOT>
```

Having received a message 15 to add a record to its "customer" table that already exists in that table, database 25 responds with the message 15 shown in Table 4. The purpose of this message 15 to inform the database 10 or 25 that originated the record that it is a duplicate and should be deleted.

Table 5 shows an exemplary record set level error message 15.

TABLE 5

```
<?XML VERSION="1.0"?>
<!DOCTYPE ROOT SYSTEM "dtds/sqlerrors.dtd">
<ROOT>
   <SQL>UPDATE CUSTOMERCCOUNT SET CUSTOMER_OID =
   106380, USER_ID = -200, TIMESTAMP = SYSDATE WHERE
   ACCOUNT_OID IN (1, 2, 3, 4, 5, 6, 7, 8, 9,
   10) </SQL>
   <TRANSACTION_ID>G00001</TRANSACTION_ID>
   <ERROR TYPE>PRIMARY KEY NOT FOUND </ERROR_TYPE>
   <PRIMARY_KEY>106380</PRIMARY_KEY>
</ROOT>
```

B. Message Prioritization

Data rules 6 may further provide for prioritization of messages 15. Some messages 15 may communicate changes for databases 25 that must be made as soon as possible, while other messages 15 may be less important, or may be communicating changes for databases 25 that may be delayed for some amount of time without adversely impacting any of the systems 30 to which a message 15 may be directed. For example, within a telecommunications enterprise, a change to a customer's billing information might always be given a higher priority than a change to a customer's service configuration. Because different messages 15 have different levels of importance, messages 15 may be prioritized according to certain data rules 6.

In one embodiment, two basic prioritization data rules 6 are invoked for prioritizing messages 15 in system 100. First, when there are a plurality of messages 15 in a queue in GIM 1, messages 15, assuming they are otherwise of equal priority, are treated in timestamp order. Second, when there are a plurality of messages 15 in a queue in GIM 1 assigned different priorities, the messages 15 from different local databases 25 are not treated in timestamp order, but rather if a first message 15 with a later timestamp than a second message 15 is otherwise assigned a higher priority than the second message 15, then the first message 15 is sent ahead of the second message 15.

There are a number of mechanisms possible for enforcing prioritization rules. In one embodiment, general database 10 comprises an Oracle database sold by Oracle Corporation of Redwood Shores, Calif. As those skilled in the art are aware, the Oracle database includes a queuing mechanism called Oracle Advanced Queuing (Oracle AQ). Use of Oracle AQ to initiate messages from general database 10 is discussed in more detail below; for present purposes it should be understood that agents 2 and 30 may be used to assign priorities to messages 15, which priorities are then used by Oracle AQ to determine the order in which messages 15 are sent. One embodiment includes two possible levels of priority for messages 15. These levels of priority are assigned according to a user identifier for a user initiating a change in general database 10 that will result in the initiation from general database 10 of sending a message 15. Users may be associated with particular local database(s) 25, and these associations stored in general database 25. When it is determined that a change in general database 10 is associated with a particular local database 25 having a higher level of priority, agent 2 or 30 is configured to assign the higher level of priority to messages 15 associated with the change. In such a case, Oracle AQ will cause a message 15 assigned the higher level of priority to be sent ahead of messages 15 having the lower level of priority, regardless of timestamps.

The foregoing scheme of message 15 prioritization is important in where system 100 includes local databases 25 that are updated in different ways. For example, a first local database 25 may be updated as a result of a user providing input through a user interface. Such changes may affect only one data entity 9 and only one or a few records in local database 25. Further, such changes may be of high importance from a business perspective, e.g., updating customer billing information, updating customer equipment information, updating repair needs, etc. A second local database 25, on the other hand, may generally be updated only through batch processes that affect thousands, or even millions, of records at a time. In such a circumstance, a message 15 from the first local database 15 should be immediately propagated to other local databases 25, and should not be delayed until batch processes associated with the second local database 25 are complete.

IV. Synchronization Process

Figure 2:
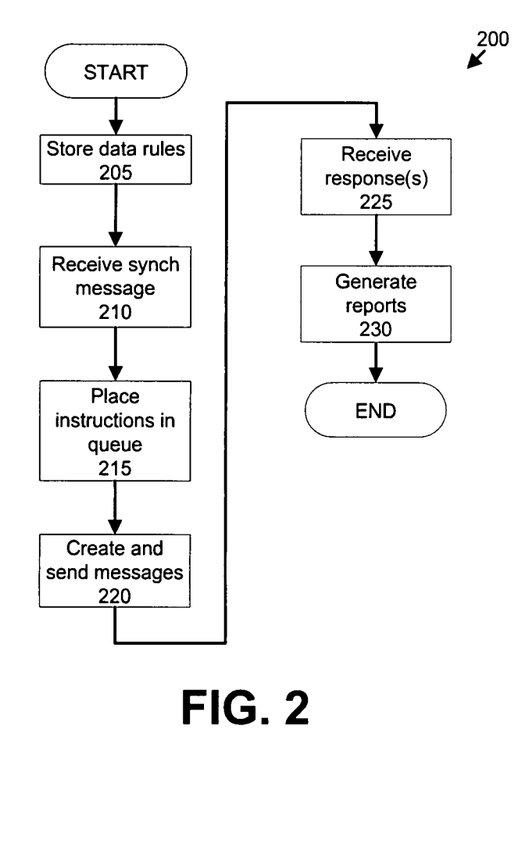
FIG. 2 illustrates a high level process for synchronizing data in a local database, according to an embodiment.

When predetermined data entities 9 are added, deleted, or modified in local database 29, message 15 is generated to inform general agent 2 of the addition, modification, or deletion. Generally, a message 15 will be generated any time a change is made to a data entity 9 that is maintained in other local databases 25 within an enterprise. Upon receiving such message in general database 10, GIM 1 provides messages 15 to local databases 25 to propagate the change to data entity 9 to all local databases 25 that require it. FIG. 2 illustrates a high level process 200 for synchronizing data in local database 25, according to an embodiment.

In step 25, data rules 6 are stored in general database 10. Mapping data rules 6 are generally included in general data model 5, as described above, and business logic data rules 6 are generally included in local agents 30, as also described above. However, in one embodiment, certain data rules 6, generally business logic data rules 6, are implemented as stored procedures in general database 10, and step 25 includes creating and/or saving such stored procedures in database 10.

Next, in step 210, GIM 1 receives a request to synchronize data concerning data entity 9 stored in a particular local database 25 with one or more other local databases 25. Such requests may be prescheduled in GIM 1, e.g., by using scheduler 7, or may be provided by agents 15 according to data synchronization protocol 35. In the latter case, a request to synchronize data often is received by GIM 1 as a message 15 from a particular local database 25 indicating that data for an element modeled in general data model 5 has been added, deleted, or modified in a first local database 25, whereupon messages 15 should be created for and sent to one or more local databases 25 to synchronize data relating to the element that has been added, deleted, or modified in the first local database 25. A process 300 for local database 25 to provide a message indicating a change concerning one or more data entities 9 is described further below with reference to FIG. 3.

Next, in step 215, general database 10 places in an internal queue instructions to propagate to local database 25 a change concerning data entity 9, e.g., using Oracle AQ as discussed above. A process 400 according to which instructions are placed in an internal queue in general database 10 is described further below with reference to FIG. 4*a*.

Next, in step 220, general agents 2 create one or more messages 15 for one or more local databases 25 according to synchronization protocol 35. Messages 15 created in this step contain instructions to database 25, such as described above with reference to Tables 1-4, to add, delete, and/or modify data concerning one or more data entities 9. Messages 15 are generally prioritized according to data rules 6, as discussed above, and are accordingly sent to local databases through messaging platform 8. A process 450 according to which agents 2 create and send messages 15 to local databases 25 is described further below with reference to FIG. 4*b*. A process 500 according to which local databases 25 receive messages 15 from GIM 1, and provide responses to such messages 15, is described below with reference to FIG. 5.

Next, in step 225, general agent 2 receives any responsive messages 15, such as an error message 15, resulting from the message(s) 15 sent in step 220, and stores such responsive messages 15 so that they may be retrieved for later reporting, e.g., in an audit log in database 10, history table in database 10, history file, etc.

Next, in step 230, agent application 2 may generate one or more reports concerning messages 15 and responses to messages 15 sent and received in step 220. For example, reports may be generated by reading and formatting a log of error messages 15.

Following step 225, process 200 ends.

V. Message Generation

A. Message Generation from Local Databases

Figure 3:
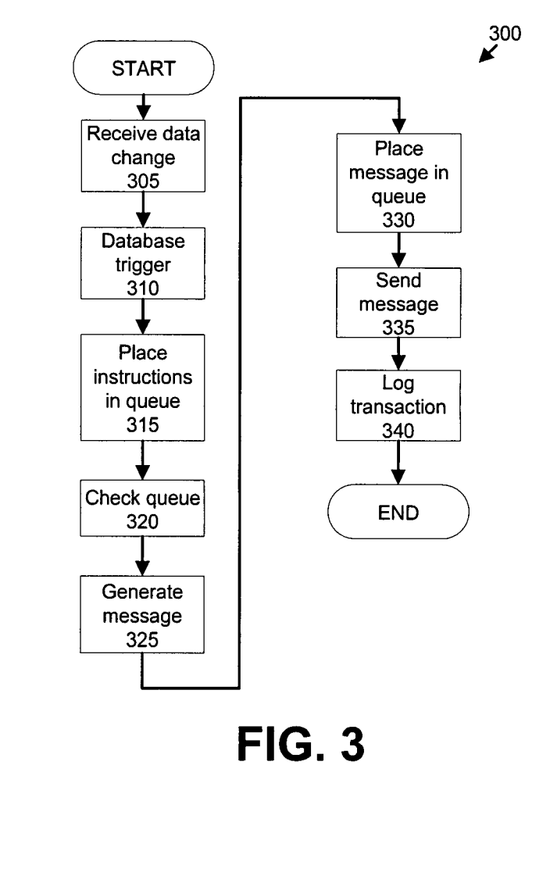
FIG. 3 illustrates a process for a local database to provide a message indicating a change concerning one or more data entities, according to an embodiment.

FIG. 3 illustrates process 300 for local database 25 to provide a message 15 indicating a change concerning one or more data entities 9, according to an embodiment.

In step 305, a change concerning data entity 9 is made in local database 25. Such change could be made in a number of ways known to those skilled in the art, such as by a user providing data through a user interface, e.g., a terminal screen, a web page, etc., which data is then submitted to local database 25. Further, the change made in step 305 could be the addition, deletion, or modification of a record related to data entity 9 in local database 25.

Next, in step 310, the change to database 25 made in step 305 invokes a database trigger. Database triggers, as known are essentially stored procedures that are automatically invoked in a database upon the occurrence of a predetermined event, e.g., a particular table is updated, or a particular field in a particular table is updated. The database trigger invoked in step 310 runs a stored procedure that places in an internal queue in database 25, e.g., Oracle AQ, instructions to send a message 15 to general database 10 concerning the change made in step 305.

Next, in step 315, instructions are placed in an internal queue as the result of the stored procedure invoked by a database trigger as described with reference to step 310.

Next, in step 320, local agent 30 retrieves instructions to send a message 15 to general database 10 from an internal queue in database 25, such as described with reference to step 315. Preferably, when local agent 30 is not processing instructions to create a message 15, local agent 30 continuously or nearly-continuously polls local database 25 to determine if there are instructions to retrieve from the internal queue described above.

Next, in step 325, local agent 30 creates message 15 for general database 10 concerning the change concerning data entity 9 made in local database 25 as described above with reference to step 305. Message 15 is then provided to local messaging platform 40 for transmission to GIM 1. As described above, message 15 is generally formatted according to synchronization protocol 35.

Next, in step 330, message 15 is placed in a queue in local messaging platform 40.

Next, in step 335, messaging platform 40 sends message 15 to message platform 8 in GIM 1.

Next, in step 340 messaging platform 40 writes information concerning message 15 and the sending of message 15 to a log file or history file, or to database 25, e.g., the time the message was sent, information about a type of message, message contents, etc.

Following step 340, process 300 ends.

B. Messages Received and Generated in General Database

Figure 4A:
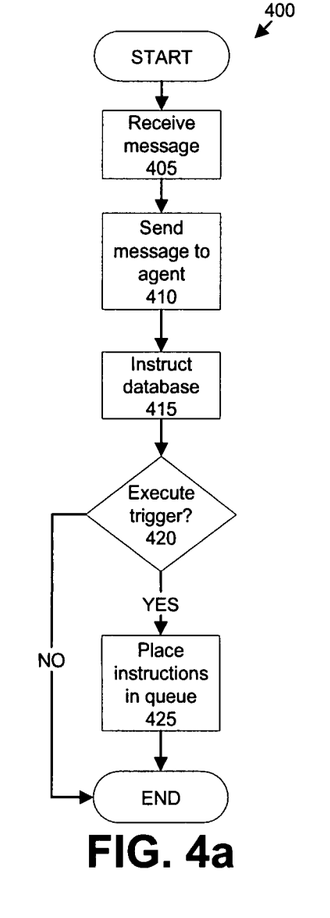
FIG. 4a illustrates a process according to which a general database receives a message and then places instructions in an internal queue, according to an embodiment.

FIG. 4a illustrates a process 400 according to which general database 10 receives a message 15 and then places instructions in an internal queue, according to an embodiment.

In step 45, GIM 1 receives message 15, such as a message 15 sent as described with reference to step 335 in process 300 above. Generally, GIM 1 receives messages in messaging platform 8.

Next, in step 410, messaging platform 8 forwards message 15 to agent 2. As noted above, GIM 1 generally includes distinct agents 2 dedicated to each local database 25 from which GIM 1 may receive messages. In fact, an embodiment includes two distinct agents 2 in GIM 1 for each local database 25 from which GIM 1 may receive messages, one agent 2 to send messages to each local database 25, and another to receive messages from each local database 25.

Next, in step 415, agent 2 interprets message 15 and provides an appropriate instruction to general database 10 based on the message 15. For example, if a particular attribute of a particular data entity 9 has been changed in a local database 25, then certain updates may need to be made to general database 10 according to general data rules 6. Agent 2 may be programmed to generate a structured query language (SQL) statement, a command to execute a stored procedure, etc., for database 10.

Next, in step 420, execution of the instruction or instructions provided in step 415 generally causes execution of a database trigger in general database 10. If no trigger is executed, process 400 ends. However, if a trigger is executed in general database 10, e.g., because the instruction or instructions provided in step 415 have updated, added, or deleted data to database 10, process 450 proceeds to step 425.

In step 425, the stored procedure triggered in step 420 is executed, causing instructions for one or more agents 2 to be placed in an internal queue, e.g., Oracle AQ discussed above. Such instructions for agents 2 generally comprise instructions to update, add, or delete data in one or more local databases 25 concerning one or more data entities 9.

Following step 425, process 400 ends.

Figure 4B:
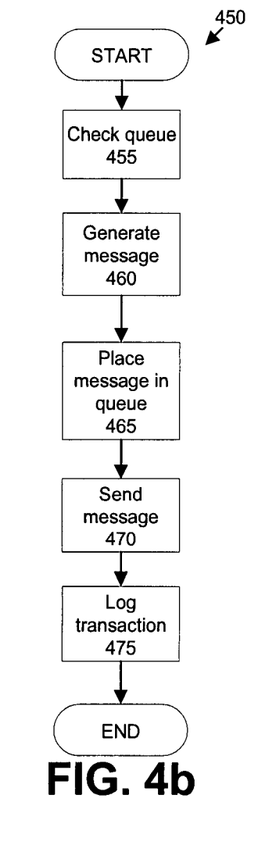
FIG. 4b illustrates a process according to which general agents create and send messages, according to an embodiment.

A process 450 according to which general agents 2 create and send messages 15 in an embodiment is described further below with reference to FIG. 4b. In embodiments including multiple general agents 2 within GIM 1, it is to be understood that process 450 may occur simultaneously or nearly simultaneously with respect to one or more general agents 2.

In step 455, general agent 2 retrieves instructions to send a message 15 to local database 25 from an internal queue in database 10, such as described with reference to step 425. Preferably, when general agent 2 is not processing instructions to create a message 15, general agent 2 continuously or nearly-continuously polls general database 10 to determine if there are instructions to retrieve from the internal queue in database 10 described above.

Next, in step 460, general agent 2 generates a message 15 for local database 25. Such a message 15 generally comprises instructions to database 25 to add, delete, or modify data concerning one or more data entities 9.

Next, in step 465, message 15 generated in step 460 in placed in a queue in messaging platform 8. As discussed above, messages 15 are generally queued in messaging platform 8 in time-stamp order, although general data rules 6 may dictate that certain messages 15 have highest priority, regardless of their time-stamps, e.g. messages 15 to update data concerning a data entity 9 that was added to, modified in, or deleted from a particular local database 25.

Next, in step 470, message 15 is sent to local database 25 by messaging platform 8.

Next, in step 475, messaging platform 8 writes information concerning message 15 and the sending of message 15 to a log file or history file, or to database 10.

Following step 475, process 450 ends.

C. Receiving Messages in Local Database

Figure 5:
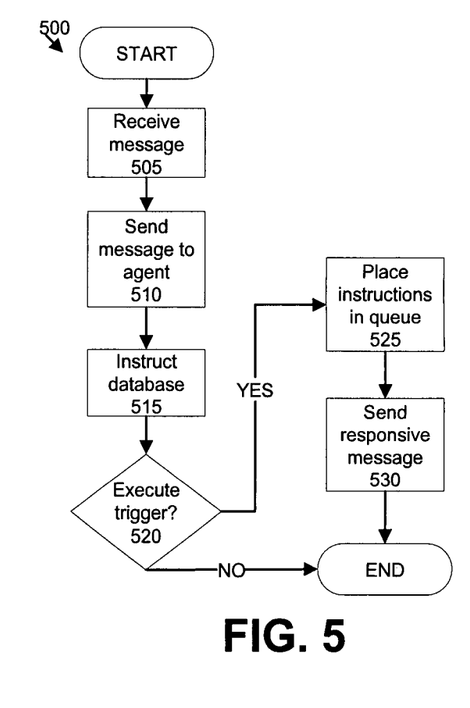
FIG. 5 illustrates a process for local database to receive messages, according to an embodiment.

FIG. 5 illustrates a process for local database 25 to receive messages 15 from GIM 1, according to an embodiment.

In step 505, database 25 receives message 15, such as a message 15 sent as described with reference to step 470 in process 450 above. Generally, database 25 receives messages in local messaging platform 40.

Next, in step 510, messaging platform 40 forwards message 15 to local agent 30. An embodiment includes two distinct local agents 30 for database 25, one agent 30 to send messages to each local database 25, and another to receive messages from each local database 25.

Next, in step 515, agent 30 interprets message 15 and provides an appropriate instruction to local database 25 based on the message 15. For example, if a particular attribute of a particular data entity 9 has been changed in general database 10 or another local database 25, then certain updates may need to be made to local database 10 according to general data rules 6. Agent 30 may be programmed to generate a structured query language (SQL) statement, a command to execute a stored procedure, etc., for database 25.

Next, in step 520, execution of the instruction or instructions provided in step 515 generally causes execution of a database trigger in local database 25. If no trigger is executed, process 500 ends. However, if a trigger is executed in local database 25, e.g., because the instruction or instructions provided in step 515 have updated, added, or deleted data to database 25, process 5050 proceeds to step 525.

In step 525, the stored procedure triggered in step 520 is executed, causing instructions for one or more agents 30 to be placed in an internal queue, e.g., Oracle AQ discussed above. Such instructions for agents 30 generally comprise instructions to update, add, or delete data in one or more local databases 25 concerning one or more data entities 9.

In step 530, database 25 sends a responsive message 15 to GIM 1 concerning the change made to database 25. This step is optional, and in one embodiment is carried out only if database 25 has experienced an error in attempting to process a transaction, in which case an error message 15 is sent to GIM 1.

Following step 530, process 500 ends.

VI. Error Detection

In addition to synchronizing local databases 25 as described above, GIM 1 advantageously may be used to detect errors in local databases 25. As discussed above, data rules 6 may include the expected format for data entities 9 in local databases 25. Accordingly, a user of GIM 1 may specify one or more data rules 6 to be tested in local database 25. For example, suppose that the primary key for a customer entity 9 in a local database 25 is a ten-digit integer data type. Further suppose that a "state" column in a "customer" table in the local database is a two-character string data type. In addition, suppose that a rule 6 in the data model 20 for the local database 25 specifies that, where the last digit of the aforementioned primary key is "3," the "state" column shall contain either "ME," "MA," "RI," "VT," or "NH." In this example, a user of GIM 1 could specify that this rule 6 for values of the "state" column in a "customer" table of database 25 be tested.

A process for error detection is similar to process 200, described above with reference to FIG. 2. However, instead of receiving a synchronization message in step 210, agent application 2 instead receives an instruction from a user of GIM 1 to test one or more particular data rules 6.

Then, in step 215, agent application 22 creates a message 15 to test the data rules 6. Messages 15 created for the purpose of testing data rules 6 are similar to messages 15 described above, but instead of adding to, deleting, or modifying data concerning one or more entities 9, a message 15 created to test data rules 6 generally makes use of an SQL "select" statement to query database 25 to determine whether data rules 6 are adhered to.

In step 225 of process 200, when data rules 6 have been tested, one or more reports are generated concerning the results of the test. Returning to the example given above, a report generated in this step might detail how many records in a "customer" table had a primary key ending in "3" that was not associated with a "state" column containing either "ME," "MA," "RI," "VT," or "NH." Such reports can be used to repair data integrity issues in local database 25.

VII. Conclusion

The processes, systems, methods, heuristics, etc. described herein have been disclosed in the context of system 100. However, the descriptions provided herein are intended to be illustrative and not restrictive, and it is to be understood that the processes, systems, methods, heuristics, etc. described herein could be equally applicable to testing other systems.

Further, with regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A system, comprising:
    a first database implemented in a computer-readable storage medium and comprising a data entity and a first data model that models the data entity, wherein the first database is communicatively coupled to a network;
    an agent comprising a data rule concerning asynchronous updates to the data entity;
    a plurality of heterogeneous second databases implemented in a computer-readable storage medium and comprising the data entity having respective second data models modeling the data entity, wherein the second databases are communicatively coupled to the network; and
    a messaging module comprising the agent and configured to send a synchronization message across the network to at least one of the second databases according to the data rule and the first data model, the data rule providing mapping between the data entity as modeled by the first data model and the data entity as modeled by at least one of the respective second data models.

2. The system of claim 1, wherein the second data model corresponds to at least part of the first data model.

3. The system of claim 1, wherein the messaging module is configured to send the synchronization message to at least two of the second databases.

4. The system of claim 1, wherein the synchronization message is a plurality of synchronization messages and the data rule comprises a rule for prioritizing the synchronization messages.

5. The system of claim 1, wherein the messaging module is further configured to receive a results message from the database and to generate a report based on the results message.

6. The system of claim 1, further comprising a data synchronization protocol that specifies a format for the synchronization message.

7. The system of claim 1, wherein the data entity is a plurality of data entities and the synchronization message concerns one or more data entities in the plurality of data entities.

8. A method, comprising:
   including a data entity in a first database according to a first data model that models the data entity;
   creating a data rule concerning asynchronous updates to the data entity;
   including the data entity in a plurality of heterogeneous second databases having respective second data models modeling the data entity; and
   sending a synchronization message to at least one of the second databases according to the data rule and the first data model, the data rule providing mapping between the data entity as modeled by the first data model and the data entity as modeled by at least one of the respective second data models.

9. The method of claim 8, wherein the second data model corresponds to at least part of the first data model.

10. The method of claim 8, wherein the messaging module is configured to send the synchronization message to at least two of the second databases.

11. The method of claim 8, wherein the synchronization message is a plurality of synchronization messages and the data rule comprises a rule for prioritizing the synchronization messages.

12. The method of claim 8, wherein the messaging module is further configured to receive a results message from the database and to generate a report based on the results message.

13. The method of claim 8, further comprising using data synchronization protocol to specify a format for the synchronization message.

14. The method of claim 8, wherein the data entity is a plurality of data entities and the synchronization message concerns one or more data entities in the plurality of data entities.

15. A method, comprising,
   receiving from a first database a first synchronization message concerning a data entity modeled according to a first data model;
   providing the synchronization message to a second database modeling the data entity according to a second data model;
   asynchronously updating a datum concerning the data entity in the second database according to the synchronization message;
   generating a second synchronization message concerning the data entity for a plurality of heterogeneous third databases having respective third data models modeling the data entity, the second message based at least in part on a data rule and the second and third data models, the data rule providing mapping between the data entity as modeled by the second data model and the data entity as modeled by the respective third data models; and
   sending the second synchronization message to the third databases.

16. The method of claim 15, wherein the data entity is a plurality of data entities, and the datum is a plurality of data.

17. The method of claim 15, wherein the second synchronization message is a plurality of second messages, the method further comprising sending one of the second messages to each of the third databases.

18. The method of claim 15, further comprising updating a datum concerning the data entity in the third databases according the synchronization message.

19. The method of claim 15, further comprising assigning a priority to the second synchronization message.

20. The method of claim 15, wherein generating the second synchronization message includes generating the second synchronization message according to a data rule.

21. The method of claim 15, further comprising receiving a third synchronization message that includes information related to the second synchronization message.

22. The method of claim 15, further comprising storing information related to at least one of the first synchronization message and the second synchronization message in a log.

* * * * *